United States Patent [19]

Koblitz et al.

[11] Patent Number: 4,714,801

[45] Date of Patent: Dec. 22, 1987

[54] SEALANT COMPOSITION

[75] Inventors: Francis F. Koblitz, York; Lynn K. Snyder, Spring Grove, both of Pa.

[73] Assignee: AMP Incorporated, Harrisburg, Pa.

[21] Appl. No.: 767,566

[22] Filed: Aug. 20, 1985

Related U.S. Application Data

[63] Continuation of Ser. No. 620,411, Jun. 14, 1984, abandoned.

[51] Int. Cl.⁴ .................. H01R 4/00; H02G 13/06; H02G 15/08

[52] U.S. Cl. .................. 174/88 R; 174/84 C; 523/122; 524/190; 524/264; 524/265; 524/291; 524/368; 524/319; 524/604

[58] Field of Search .................. 174/88 R, 84 C; 523/122; 524/604

[56] References Cited

U.S. PATENT DOCUMENTS

| | | | |
|---|---|---|---|
| 3,410,950 | 11/1968 | Freudenberg . | |
| 3,507,977 | 4/1970 | Pusey | 174/87 |
| 3,646,101 | 2/1972 | Cyba | 260/462 R |
| 3,842,191 | 10/1974 | Neale, Sr. | 174/88 R |
| 3,875,323 | 4/1975 | Bopp et al. | 174/23 C |
| 3,882,042 | 5/1975 | McGuigan et al. | 252/400 R |
| 3,882,043 | 5/1975 | McGuigan et al. | 252/402 |
| 3,882,044 | 5/1975 | McGuigan et al. | 252/402 |
| 4,107,451 | 8/1978 | Smith, Jr. et al. | 174/84 R |
| 4,180,652 | 12/1979 | Nogami et al. | 525/437 |
| 4,209,438 | 6/1980 | Okada et al. | 260/31.8 X A |
| 4,256,625 | 3/1981 | Dachs | 260/40 R |
| 4,405,729 | 9/1983 | Schweitzer | 523/36 |

*Primary Examiner*—John C. Bleutge
*Assistant Examiner*—Robert E. L. Sellers, II
*Attorney, Agent, or Firm*—Katherine A. Nelson

[57] ABSTRACT

A sealant material that is relatively chemically inert toward plastics and adhesives is comprised of a homogeneous mixture of polymeric adipate polyester and fumed silica, the polyester comprising about 80 to 85 percent by weight of the mixture and the fumed silica comprising about 15 percent to 20 percent by weight of the mixture. In the preferred embodiment, the sealant material further contains about 0.02 to 0.04 percent of an organofunctional silane and about 0.03 percent to 0.07 percent of a fluorosurfactant.

10 Claims, 3 Drawing Figures

SEALANT COMPOSITION

This is a continuation of application Ser. No. 620,411 filed June 14, 1984, now abandoned.

FIELD OF THE INVENTION

This invention relates to hydrophobic sealant composition and more particularly to hydrophobic sealants used to seal electrical connectors.

BACKGROUND OF THE INVENTION

Various sealant compositions have been used in electrical connectors, particularly to protect the electrical connection from heat and moisture. Protection from atmospheric attack is especially important in the telecommunications industry as is a high order of long term electrical insulation.

U.S. Pat. No. 3,410,950 discloses a connector having a sealant system, the disclosure of which is incorporated herein by reference. The preinsulated open U or channel-type connector disclosed therein has one insulating film surrounding the outside of the open U-type ferrule, and a second layer of film covering the inside of the ferrule, the ferrule having one or more wire receiving projections on its inside surface. Sealing material is contained between the inside insulating film and the surface of the ferrule adjoining the projections. When the connector is crimped onto wires, the projections rupture the inside film layer permitting the sealing material to flow around the wires.

Generally the sealants used with connectors of the type described above have a silicone base. Although these sealants do repel moisture, the sealant have tendency over a period of time to creep out of the connector. Their oil base has been observed to separate and to "cream" or bleed during storage. Furthermore, fractions of the silicone based sealants have significant vapor pressure under common ambient conditions. Fractions of the sealant, therefore, vaporize when it is exposed to the atmosphere and condense on nearby surfaces including switch gear contacts resulting in accelerated arcing and corrosion.

The sealant material disclosed herein has equivalent dielectric properties of silicone based sealants. The problems described above, however, are greatly reduced. The composition of the invention is more hydrophobic than silicone based sealants. The sealant has a higher viscosity, thus greater reducing the problem of "creep". The lower vapor pressure of the herein disclosed sealant greatly decreases the problem of contamination of the surrounding area.

The sealant is a homogeneous mixture comprised of a polymeric polyester derived from adipic acid and a fumed silica. The polyester comprises from about 80 percent to about 85 percent by weight of the mixture and the fumed silica comprises from about 15 percent to about 20 percent by weight of the mixture. In the preferred embodiment the mixture is further comprised of from about 0.02 percent to about 0.04 percent of silane to increase the homogeneity and the moisture repellency of the sealant. From about 0.03 percent to 0.07 percent of a low interfacial tension surfactant is also added to increase the wetting and dispersion of the fumed silica.

Antimicrobial agents, corrosion inhibitors and/or antioxidants may also be added to the formulation.

The use of sealants in electric connectors can be understood by referring to the following drawings.

DESCRIPTION OF THE DRAWINGS

FIG. 1 shows a typical channel type connector 10 which uses a sealing material 12. Connector 10 is comprised of an outer insulating film 14, an open U-type metal ferrule 16 having a plurality of wire receiving projections 18 extending from inner surface 20 of ferrule 16. Sealing material 12 is deposited on the ferrule 16, particularly in the areas of projections 18. Connector 10 further has an inner insulating film layer 20 therein which extending over the sealant 12, and projections 18. Film layer 20 is sealed usually by means of heat to the sides of the ferrule 16 thus encasing the sealant material. In using the connector 10, wires 22 are inserted from opposite ends of the connector 10 and seated in projections 18. As is shown in FIGS. 1 and 2 the wires 22 lie on top of inner film layer 20. FIG. 3 shows a cross section of the crimped connector 10. During the crimping of the connector 10, wires 22 rupture the film layer 20 as they are forced into receiving slots 24 in projection 18. Sealant 12 flows through the breach in the film layer 20 and surrounds the intersections of the wires and projection thereby sealing the immediate contact areas between the wires and connector.

Figure 1:
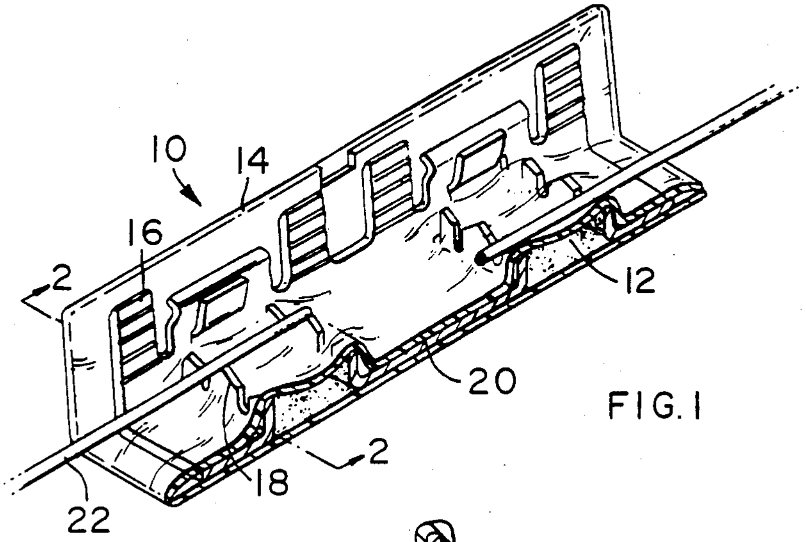
FIG. 1 is a longitudinal sectional perspective view of an uncrimped connecting device having a sealant therein.
Figure 2:
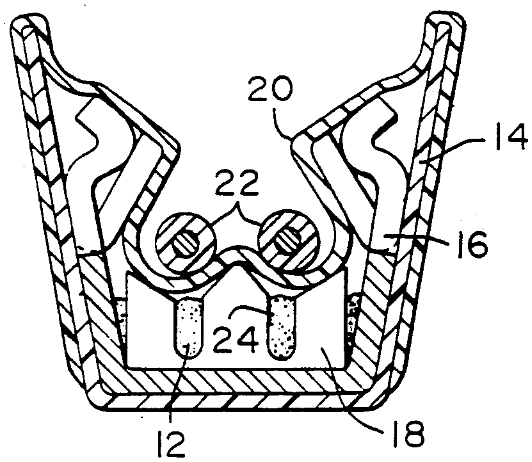
FIG. 2 is a cross sectional view taken along lines 2—2 of the device in FIG. 1 showing the location of the sealant with respect to the wires.
Figure 3:
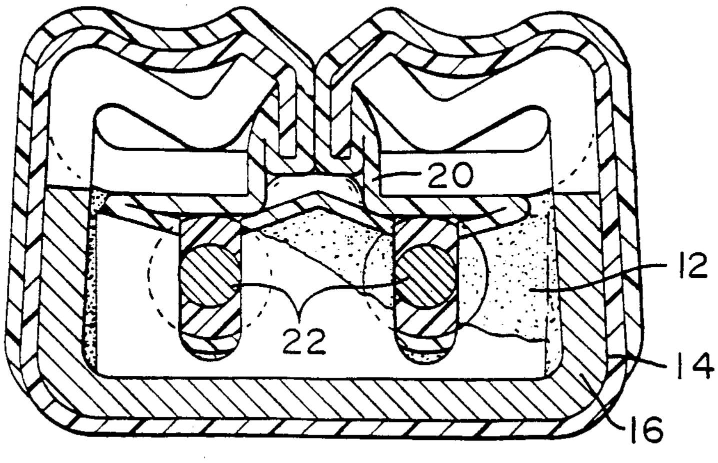
FIG. 3 is a view similar to FIG. 2 but showing the positions of the sealant and parts after crimping.

The sealant used in the manner described must have certain physical and chemical properties. It must be chemically inert to the metal and plastic films that are used in the connector. It also must be sufficiently thixotropic so it will not flow out of the connector during crimping. Thixotropic is known in the art as the property of various gels of becoming fluid when agitated or disturbed and to return to the gel form at rest. At the same time it must be capable of being flowed through a feeding means which dispenses measured amounts of the sealant in the desired areas. It is important that the rheology be such that the deposits of sealant will separate easily from the dispenser and not cause "stringing". Furthermore, the sealant must be essentialy hydrophobic to keep moisture out of the connector. The sealant must also remain stable during the manufacture process, and in particular to the conditions imposed on the sealant while the inner film layer is being sealed to the connector.

The base for the sealant, in the preferred embodiment, is compounded from a polymeric polyester derived from adipic acid. Preferably, the polymeric polyester should have a dielectric strength greater than 200 v/mil, a solidification point of less than 0° F. (018° C.) The molecular weight of the polymeric polyester should be in the range of 2200 to 6000, preferably 4000 to 5000. The preferred polyols are 1,3 or 1,4-butylene glycol. Other glycols and mixed glycols can also be used including those with terminated side chains. Suitable polyesters are available from Emergy Industries, Cincinnati, Ohio, under the trade name Plastolein 9776, and from the C. P. Hall Co., Chicago, Ill., under the trade names Plasthall P-644 and Paraplex G-59. These are all characterized by their inertness to plastic films and adhesives and their wide range of thermal stabilitiy and functionality.

A hydrophobic fumed silica is used in the preferred embodiment. Hydrophobic fumed silica is the reaction product of dimethyldichlorosilane with fumed silicon dioxide. One such silica is availale from Degussa Corp., Teterboro, N.J., under the trade name Aerosil R-974. Other hydrophobic fumed silicas such as Tullanox 500 from Tulco Corp., Ayer, Mass., may be used as well as combinations of silicas such as Degussa Corporation's Aerosil 200 and R-972. It is preferable that fumed silica be of the class considered "fully hydrophized", because it confers effective viscosity control, and water repellency and has a refractive index that functionally matches that of the polyester.

The addition of about 0.02 percent of an organofunctional silane assists in the dispersion and homogenization of the silica and increases the moisture repellency of the sealant. It is believed that the silane is preferentially adsorbed onto the surface of the silica, displacing air and promoting wetting and dispersing of the silica by the polymeric polyester. This has an insulating or further hydrophobizing effect on the silica surface and polar functional moieties in the polyester constituents. A suitable silane 3-methacryloxypropyltrimethoxysilane can be obtained from Union Carbide Corporation, Danbury, Conn.

From about 0.03 percent to 0.07 percent of a fluorinated nonionic surfactant is also added to the components in the preferred embodiment. The surfactant aids in the dispersion of the fumed silica. Fluorochemical acrylate oligomer surfactants are used in the preferred embodiment. Such fluorinated surfactaants are available from Minnesota Mining and Manufacturing Co., St. Paul, Minn., under the trade names Fluorad FC-430 and Fluorad FD-431.

Other additives that may be used in the sealant for longer functional performance include antimicrobials, corrosion inhibitors and antioxidants. In the preferred embodiment, from about 1.0 percent to about 1.5 percent 10,10'-oxybisphenoxarsine was added as a fungicide and bactericide. This additive is available from Ventron Division of Thiokol Corp., Danvers, Mass., under the trade name Vinyzene BP-2U.

From about 0.05 percent to 0.2 percent benzotriazole available for example from Sherwin Williams, Cleveland, Ohio, was added as a corrosion inhibitor for copper conductors. From about 0.04 percent to 0.6 percent of an antioxidant tetrakis[methylene 3-(3',5'-di-tert-butyl-4'-hydroxyphenyl)propionate]methane was also added. The Code of Federal Regulations designates this compound as tetrakis[methylene(3,5-di-tert-butyl-4-hydroxyhydrocinnomate)]methane. This antioxidant is available from Ciba-Geigy, Hawthorne, N.Y. The formulation of Irganox 1010 is disclosed in U.S. Pat. Nos. 3,285,855 and 3,644,482. There are numerous other antimicrobials, corrosion inhibitors and antioxidants available on the market, which will perform the same functions as the ones used herein.

The sealant material is made by adding the silane, fluorinated surfactant and all of the desired optional additives to the plasticizer. The resulting mixture is heated to a temperature no greater than 200° F. (93° C.) for approximately 15 minutes until all the added components are dissolved in the plasticizer. The fumed silica is added to the heated mixture. To ensure homogeniety, the mixture is heated and continuously stirred until the silica is uniformly dispersed.

The sealant material of the present invention is optically clear, has low toxicity to humans, and is non-corrosive to glass, metals and plastics. The sealant is compatible with plastics and plastics bonded to metal because it does not cause delamination of plastic articles or plastic laminates. The sealant has a refractive index of 1.465, withstands temperature cycling from −25° to 100° C. without change or damage, and is essentially chemically inert. The sealant, therefore, is suitable for protecting and coupling optical materials.

It is to be understood that the U-shaped crimpable connector is used as a representative sample only. The herein disclosed sealant may be used for sealing other open and closed barrel terminals. Furthermore, its physical properties make it suitable for optical uses such as environmentally protective optical fiber couplers, temporary optical cementing and sealing (caulking) of glass joints, temporary removable protective coatings, and low toxicity moisture barriers and patches.

The following examples illustrate the invention. They are not to be construed as limitations on the instant invention except as indicated in the appended claims. All compositions are expressed as parts by weight except where specifically indicated otherwise.

EXAMPLE NUMBER 1

A batch of sealant was prepared using a high shear dual shaft mixer fitted with vacuum attachments and heating jacket. The following ingredients given in parts by weight (pbw) were charged to the mixer in the order shown: 326 pbw polymeric adipate polyester, 4.4. pbw of a bactericide, 0.4 pbw of a corrosion inhibitor, 2.0 pbw of an antioxidant, 0.08 pbw organofunctional silane, and 0.13 pbw of a non-ionic fluorosurfactant. The mixer was closed and heated to 180° F. (82.2° C.). Agitation was begun using a sweep arm setting of 40 rpm for 5 min. Sixty-six pbw of fully hydrophobized fumed silica (particle size: 0.200 $m^2/g$) was charged to the mixer followed by closing the mixer and wetting out the fumed silica by stirring with a sweep arm setting of 25 rpm.

After all the fumed silica was visibly wetted, the pressure on the mixture was reduced to 29 inches of mercury less than ambient. The materials were mixed for 1 hr 15 min using a sweep arm setting of 25 rpm and a high speed disperser blade setting of 1500 rpm.

A clear, homogeneous, well dispersed, thixotrpic sealant resulted with a viscositiy of 230 units (0.1 mm) as measured by the ASTM D217 method for testing cone penetration of lubricating greases as described below. The material was discharged into a 55 gallon drum and retained for further characterization as shown in Example 2 below. ASTM D217 is a standard test procedure entitled "Standard Test Methods for Cone Penetration of Lubricating Grease", adopted by the American Society for Testing Materials (ASTM) and used throughout the materials industry to determine viscosities of lubricating greases. This procedure was used to determine the cone penetration of unworked sealant preparation, i.e. the penetration at 25° C. (77° F.) of a sample of the sealant that has received only minimum disturbance in transferring the sample to a grease worker cup or other suitable container. The apparatus used was a penetrometer, which is designed to measure in tenths of a millimeter the depth to which a standard cone penetrates the sample. The penetrometer has an adjustable table to properly position the cone on the surface of the sample prior to releasing the cone. The standard cone used was made of magnesium with a detachable, hardened steel tip having a total weight 102.5±0.05 g in accordance to specifications of the test. A quantity of the sealant material and the test sample container are brought to a temperature of 25°±0.5° C. in a water or air bath. A sample of the material is transferred to the container and packed to eliminate air pockets. The sample in the container is leveled and placed on the penetrometer table. The apparatus is adjusted so that the tip of the cone just touches the surface of the sample. The cone shaft is then released and allowed to drop for 5.0±0.1 seconds. The amount of penetration is read from an indicator on the apparatus. In accordance with the procedure the values given are the average of three penetration tests per sample.

EXAMPLE 2

The physical properties of the sealant of Example 1 were compared to an extensively used silicone sealant in current commerce. The resulting test values shown below illustrate the superior appearance, homogeneity (fineness of grind), and creep of the sealant.

| Property Measured | Sealant Example 1 | Silicone Sealant |
|---|---|---|
| Appearance | Clear transparent | White translucent |
| Cone Penetration (ASTM D217) (units are 0.1 mm) | 180–280 | 200–300 |
| Bleed @ 170° F. 24 hrs. | 0% | 0% |
| Specific Gravity (g/ml) | 1.27 | 1.03 |
| Index of Refraction | 1.465 | 1.407 |
| Creep (Migration in work area) | None | Extensve (50 ft) |
| Fineness of grnd (ASTM D1210) (NS) | 8 | 1.5 |
| Slump test | 0.1 inch | 0.1 inch |
| Stringy rheology as measured by a modified ASTM Izod impact apparatus (inches) | .75–1.25 | 75–1.25 |

EXAMPLE 3

The effect of adding an organofunctional silane coupling agent to a hydrophobic sealant was studied with respect to improvement of water repellency. Silane levels of 0%, 0.02%, 0.04%, 0.08%, 0.16% and 0.32%, based on the weight of the sealant, were used. The moisture sorption of these materials in a 95 percent relative humidity cabinet was tested at 15 days, 30 days and 42 days using the water determination method known to those skilled in the art as the Karl Fisher titration.

Silane levels of 0.02 to 0.04% proved to be the most effective yielding moisture sorption levels when methacryloxypropyltrimethoxysilane was used as the additive. The results are represented in the table below.

| Sample | Moisture Sorption/Time 15 days | 30 days | 42 days |
|---|---|---|---|
| 0% Silane | 2.0% | 2.33% | 2.46% |
| .02% Silane | 2.4% | 2.33% | 2.21% |
| .04% Silane | 2.2% | 1.92% | 2.36% |
| .08% Silane | 2.4% | 2.48% | 3.07% |
| .16% Silane | 2.2% | 2.95% | 2.85% |
| .32% Silane | 2.2% | 2.7% | 3.23% |

We claim:

1. An electrical connector for electrically and sealingly connecting electrical wires therein, comprising:
   - an electrical terminal having terminating section means in which the electrical wires can be electrically terminated when pressure is applied to terminate the wires therein;
   - an outer housing film along which the terminating section means extends;
   - sealant material in a gel condition disposed along said terminating section means, said sealant material having a viscosity in the range of 180 to 280 units of 0.1 mm each as measured by the ASTM D217 Standard Test Methods for Cone Penetration of Lubricating Grease, said sealant material comprising a homogeneous mixture of a polymeric adipate polyester having an average molecular weight in the range of 2200 to 6000 as calculated from solution viscosity measurements, and a fumed silica, the polyester forming about 80 to 85 percent by weight of the mixture while the fumed silica forms about 15 to 20 percent by weight of the mixture;
   - an inner film secured to said outer film and covering said sealant material, said inner film being ruptured when a terminating force is applied to said terminating section means to terminate the wires disposed therein to thereby terminate the wires therein and the sealant material being flowable under pressure created by the terminating force causing the sealant material to surround and seal the connection established between the wires and the terminating section means, the sealant material being non-migratory thereby remaining in its gel condition in the established sealing position.

2. The electrical connector as defined in claim 1 wherein said sealing material is further comprised of about 0.02 percent to 0.04 percent of an organofunctional silane.

3. The electrical connector as defined in claim 1 wherein said sealing material is further comprised of about 0.03 to 0.97 percent of a fluorosurfactant.

4. The electrical connector as defined in claim 3 wherein said sealing material is further comprised of about 0.4 to 0.6 percent of antioxidant.

5. An electrical connector as defined in claim 3 wherein said sealing material is further comprised of about 0.04 to 0.2 percent of corrosion inhibitor.

6. A connector for sealingly connecting transmission means therein comprising:
   - connecting area means for receiving the transmission means therealong,
   - sealant material in a gel condition disposed along said connecting area means, said sealant material having a viscosity in the range of 180 to 280 units of 0.1 mm each as measured by the ASTM D217 Standard Test Methods for Cone Penetration of Lubricating Grease, said sealant material comprising a homogeneous mixture of a polymeric adipate polyester having an average molecular weight in the range of 2200 to 6000 as calculated from solution viscosity measurements, and a fumed silica, the polyester forming about 80 to 85 percent by weight of the mixture while the fumed silica forms about 15 to 20 percent by weight of the mixture;
   - the sealant material being flowable under pressure created by force exerted to connect said transmission means, causing the sealant material to surround and seal the connection established between the transmission means and the connecting area means, the sealant material being non-migratory thereby remaining in its gel condition in the established sealing position.

7. The electrical connector as defined in claim 6 wherein said sealing material is further comprised of about 0.02 percent to 0.04 percent of an organofunctional silane.

8. The electrical connector as defined in claim 6 wherein said sealing material is further comprised of about 0.03 to 0.97 percent of a fluorosurfactant.

9. The electrical connector as defined in claim 8 wherein said sealing material is further comprised of about 0.4 to 0.6 percent of antioxidant.

10. The electrical connector as defined in claim 8 wherein said sealing material is further comprised of about 0.04 to 0.2 percent of corrosion inhibitor.

* * * * *